June 9, 1959
C. J. SEUR ET AL
CIRCUIT-ARRANGEMENT FOR USE IN TELEVISION TRANSMITTING DEVICES FOR SCANNING FILMS
Filed Nov. 13, 1953
2,890,278
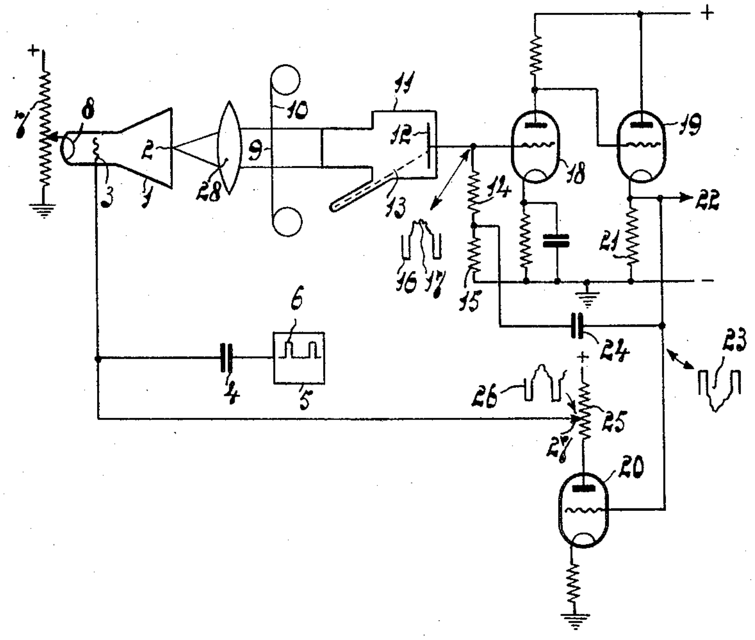
INVENTORS
CHRISTIAAN JACOBUS SEUR
HENDRIKUS JOHANNES BOON
BY [signature]
AGENT // United States Patent Office 2,890,278

Patented June 9, 1959

2,890,278

CIRCUIT-ARRANGEMENT FOR USE IN TELEVISION TRANSMITTING DEVICES FOR SCANNING FILMS

Christiaan Jacobus Seur and Hendrikus Johannes Boon, Hilversum, Netherlands, assignors, by mesne assignments, to North American Philips Company, Inc., New York, N.Y., a corporation of Delaware Application November 13, 1953, Serial No. 391,924

Claims priority, application Netherlands November 28, 1952

2 Claims. (Cl. 178—7.2)

This invention relates to circuit-arrangements for use in television transmitting devices for scanning films in which a charge image of the film to be transmitted is produced on the scanning electrode of a picture tube by means of a light source which is periodically released by a voltage pulse, said scanning electrode being scanned by a cathode-ray beam in the periods between the occurrence of the voltage pulses.

Such devices have the disadvantage that the film commonly consists of portions representing alternately bright and dark scenes, so that the quantity of light being transmitted is not constant. If such a film is projected in the ordinary way such as in cinemas, the film is reproduced, in desired manner with unvaried contrast ratio since in such a projection linear elements only play a part.

Such an unvaried reproduction of contrast in practice also occurs in a film-scanning device in which for scanning use is made of a luminous spot scanning at constant velocity and produced on the screen of a cathode-ray tube by a cathode-ray beam.

The light transmitted by the film in this device strikes a photo-electric cell. Since a photo-electric cell exhibits a curve which is substantially linear, the contrast ratio is substantially not varied.

However, the device to which the circuit-arrangement according to the invention relates utilises a light source which is periodically operative, a picture tube being being arranged behind the film. However, such picture tubes exhibit characteristic curves which are by no means linear, so that the contrast ratio in the output signal of the picture tube, if no particular steps are taken, is different from that in the initial image of the film. Furthermore, unless special steps are taken, the amount of light transmitted by the film and supplied to the picture tubes varies considerably, so that it is not possible to use the picture tube at the light quantity which is optimum for correct operation.

The object of the invention is to mitigate the said disadvantages.

The circuit-arrangement according to the invention is characterized in that the pulses (photo-pulses) produced during the occurrence of the voltage pulses in the output circuit of the picture tube have derived from them a negative feed-back voltage for the voltage pulses determining the brightness of the light source.

The negative feed-back voltage is thus derived from pulses which occur at the output of the picture tube at the moment at which the light source is operative and the charge image on the scanning electrode of the picture tube is formed. As is well-known the amplitude of such a pulse, which hereinafter will be termed "photo-pulse" for the sake of clearness, is intimately connected with the brightness, i.e., the light transmissiveness, of the film image exposed at this moment to the light source, the amplitude of the photo-pulse substantially providing a measure of the integrated brightness of the image of the film.

When the light source is released with the aid of a voltage pulse, the amplitude of the photo-pulse in the case of a dark image of the film, if no use is made of feed-back coupling, has a low value, whereas the said amplitude in the event of a bright image of the film is large in the same case.

If, however, use is made of the negative feed-back according to the invention, the brightness of the light source is increased when a dark image of the film occurs and is reduced when a bright image of the film occurs, so that the amplitude of the photo-pulse varies only slightly. Furthermore, the total amplitude of the picture signal occurring at the output of the picture tube between two photo-pulses varies only slightly.

Consequently, it is possible to use the picture tube at the light quantity which is optimum for this tube.

A further advantage of the circuit according to the invention results from the fact that the amplitude of the photo-pulse remains substantially constant, since the photo-pulse, as is the desired output signal of the picture tube, is supplied to amplifiers arranged behind the output circuit of the tube. Since the photo-pulse is an unwanted signal, steps are taken in the said amplifier either to cut-off the photo-pulse or to reduce it to a small amplitude.

This involves difficulties in the case of a varying amplitude of the photo-pulse, which difficulties are considerably decreased in the circuit according to the invention in which the amplitude of the photo-pulse is substantially constant and hence of known value.

Furthermore, if no use is made of feed-back coupling and if the film has a high transmissivity for light, or if the film is removed from the scanning device, the picture tube is lighted to such an extent that its normal operation is disturbed by saturation phenomena.

In one advantageous embodiment of the circuit-arrangement according to the invention, the luminous spot occurring at a determined area on the screen of a cathode-ray tube is used as the light source, the occurrence of the cathode-ray beam providing the luminous spot being controlled by voltage pulses periodically supplied to a control electrode of the cathode-ray tube, and pulses derived from the photo-pulse being supplied with a polarity decreasing the brightness of the luminous spot to a control electrode of the cathode ray tube.

It is to be noted here for the sake of completeness that it is already known to utilise negative feed-back for the brightness control of the beam in a film-scanning device which utilises a moving luminous spot and in which the cathode-ray beam is thus deflected. In such a known device the light transmited by the film is intercepted by a photo-electric cell, so that in the absence of negative feed-back the contrast is not varied, as previously mentioned in the preamble. Consequently, the object of the negative feed-back in this known device is to obtain automatic contrast control which is matched to the properties of the television receiving device. A further difference with respect to the circuit-arrangement according to the invention is that in known devices the negative feed-back is derived either directly or after rectification from the desired picture signal which occurs at the output of the photo-cell amplifier.

In order that the invention may be readily carried into effect, it will now be described with reference to the accompanying drawing showing, by way of example, one embodiment thereof.

In the figure, the reference numeral 1 indicates the cathode-ray tube having a screen on which a luminous spot periodically occurs at 2. For this purpose a control electrode 3 is controlled by way of a capacitor 4 by a pulse generator 5 providing pulses 6 of positive polarity. The further means known per se for producing and focussing the cathode-ray beam are not shown, since they are not essential for proper understanding of the circuit-arrangement according to the invention. However, there is shown that, by way of a potentiometer 7, a positive biassing potential is applied to a cathode 8 of cathode-ray tube 1. Said biassing potential has a value such that the tube is not conductive in the absence of the pulses 6.

The spot 2 serves as an intermittently-operative light source for lighting an image 9 of a film 10 and for this purpose a lens system 28 is provided.

In the figure, the transport mechanism for the film and the coupling of the film transport with the pulse source 5 and with the scanning means of the picture tube (mentioned hereinafter) are not shown, since as before they may be of known kind.

The light transmitted by the image 9 of the film strikes a picture tube 11, also of known kind, preferably an image iconoscope, bringing about a charge image on a scanning electrode 12 thereof. In the period between two pulses 6 of the pulse generator 5, the charge image on a scanning electrode 12 is scanned in known manner by the aid of a cathode-ray beam 13.

During the exposure of film 10 to the luminous spot 2, a photo-pulse 16 occurs by way of resistors 14 and 15 at the output circuit of the picture camera, followed by picture signal 17 occurring during scanning in the picture tube 11 by means of the cathode-ray beam 13. This total signal is supplied to an amplifier which, in the figure, comprises three D.C.-coupled discharge tubes 18, 19, 20. The direct-current coupling is otherwise not essential. The second tube 19 of the said amplifier is of the grounded-anode amplifier type, i.e. the anode is grounded, for the electric signals, via the anode power supply. The signal which occurs across a cathode resistor 21 may be derived at 22 to be supplied to further amplifying stages in the picture channel.

The voltage occurring across resistor 21 and the shape of which is shown again at 23 is made active, by way of a capacitor 24, as a negative feed-back voltage across resistor 15 in the input circuit of the tube 18.

The output voltage 23 is also supplied to the phase-inverting tube 20, so that the signal indicated at 26 occurs across an anode resistor 25 of this tube. The said signal is applied by way of a tapping 27 on resistor 25 to the control electrode 3 of cathode-ray tube 1.

During the occurrence of the desired image signal, the voltage drop across the resistor 25 in the anode circuit of tube 20 is comparatively small, so that the positive biassing potential of the cathode 8 of cathode-ray tube 1 is required to be sufficiently high, in order that the tube 1 remains cut off.

During the occurrence of the pulses 6, the photo-pulses in the signal 26 also occur, i.e. with opposite polarity.

If the film image 9 has a high value of light transmissiveness, the photo-pulse 16 occurring in the output of the picture tube 11 has a large amplitude in the absence of negative feedback, so that a voltage decrease of the signal 26 results during the occurrence of the photo-pulse. This decrease in voltage is supplied to the control grid 3 of the cathode-ray tube, so that the increase in potential of control grid 3, as a result of the pulse 6, is counteracted and the brightness of the luminous spot 2 is correspondingly decreased.

If the film image 9 has a low value of transmissiveness for light, the decrease in voltage at point 27 upon occurrence of the photo-pulse is less great, so that the brightness of the luminous spot 2 is comparatively increased.

It will be evident, that the value of the pulses 6 may alternatively be varied directly by acting upon the amplitude of the pulses produced by the generator 5 by the aid of the voltage derived from point 27.

As an alternative, it is possible for the signal 26 to be supplied to a different control electrode of the tube 1.

What is claimed is:

1. A circuit-arrangement for use in a television transmitting device for scanning a film having images thereon, comprising a picture tube having a scannable electrode and an output circuit therefor, a cathode-ray tube having a control electrode and a screen and adapted to produce a luminous spot on a predetermined area of said screen under the control of said control electrode, said cathode-ray tube being positioned so that said luminous spot will produce a projected image of said film on said picture tube, said picture tube having means for forming a charge image on said scannable electrode in accordance with said projected image, a pulse voltage source connected to said control electrode to cause said luminous spot to be produced periodically whereby periodic photo-pulses are produced in said output circuit as a function of the average light transmissiveness of said film images simultaneously with the formation of charge images on said scannable electrode, said picture tube further including means providing a cathode-ray beam for scanning said electrode in the period between the occurrence of the voltage pulses to produce an image signal in said output circuit, means coupled to said output circuit for deriving a negative feedback pulse voltage from the pulses produced in said output circuit, and means for applying said negative feedback voltage to said control electrode of the cathode-ray tube with a polarity tending to decrease the brightness of said luminous spot.

2. A circuit-arrangement for use in a television transmitting device for scanning a film having images thereon comprising a picture tube having a mosaic and an output circuit therefor, a cathode-ray tube having a cathode, a control electrode and a screen and circuits therefor, a voltage source for producing voltage pulses, means for applying said pulses to said control electrode to produce a periodic luminous spot on a predetermined area of said screen, said luminous spot being disposed to apply a charge image of said film on said mosaic and to produce in said output circuit photo-pulses as a function of the average light transmissiveness of said film images, said picture tube further including means providing a cathode-ray beam for scanning said mosaic in the period between the occurrence of said voltage pulses, a first amplifying stage comprising a first electron discharge device having an anode and a control electrode coupled to the output circuit of said picture tube, a cathode-follower amplifying stage comprising a first electron discharge tube having a cathode and a control grid coupled to the anode of said first device, means for applying a negative feedback voltage from said first tube to said first device, a phase-inverting tube having an anode and a control grid and circuits therefor, the control grid of said phase-inverting tube being coupled to the cathode of said first tube, the anode circuit of said phase-inverting tube including a resistor having a tap thereon, and means for applying a negative feedback pulse voltage from said tap to the control electrode of said cathode-ray tube to govern the amount of light emanating from said luminous spot.

References Cited in the file of this patent

UNITED STATES PATENTS

| | | |
|---|---|---|
| 2,188,679 | Dovaston et al. | Jan. 30, 1940 |
| 2,480,425 | Simmon | Aug. 30, 1949 |
| 2,499,181 | Downes et al. | Feb. 28, 1950 |
| 2,651,674 | Theile | Sept. 8, 1953 |
| 2,804,498 | Theile | Aug. 27, 1957 |

FOREIGN PATENTS

| | | |
|---|---|---|
| 695,974 | Great Britain | Aug. 19, 1953 |